Figure 1:
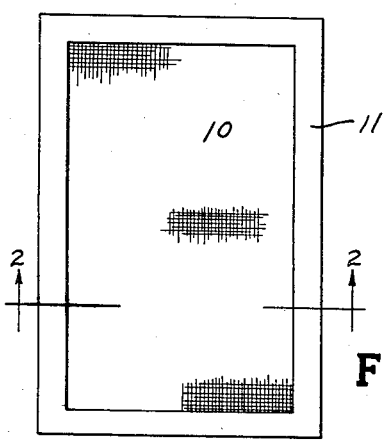

July 25, 1933.   G. S. ROWELL   1,919,483
COMBINED COLOR FILTER AND SCREEN
Filed Oct. 3, 1931

Inventor
George S. Rowell,
By Bates, Golrick & Teare,
Attorneys

Patented July 25, 1933

1,919,483

UNITED STATES PATENT OFFICE

GEORGE S. ROWELL, OF CLEVELAND, OHIO, ASSIGNOR TO MULTIGRAPH COMPANY, OF WILMINGTON, DELAWARE, A CORPORATION OF DELAWARE

COMBINED COLOR FILTER AND SCREEN

Application filed October 3, 1931. Serial No. 566,642.

This invention relates to combined color filters and screens, and more particularly to a new article of manufacture which will carry out the functions of both the usual color filter which is frequently employed in the production of photographic reproductions and the cross-line screen, such as is used in connection with photolithographic and other photo printing processes.

It is well known that in order to reproduce fine gradations in tone by a printing process, such as photolithography, it is customary to break up the printing area into minute dots or squares, such breaking up being accomplished by means of screens which produce a pattern of light and dark in the lines and dots, the light falling on the sensitive surface of the printing plate.

Also, in connection with the reproduction of colors, and in making correct monochrome reproductions of colored objects, it is customary to employ color filters to remove or hold back some of the rays of colored light reflected from the subject to be reproduced.

Heretofore separate color filters and screens have generally been employed. The prior type of color filter comprises a piece of colored glass or gelatin, which is usually positioned near the lens of the camera. The type of screen employed generally at the present time comprises ruled cross lines or other patterns imposed on a sheet of glass usually by means of a photographic process, the surface of the glass bearing the pattern being covered with another sheet of glass, the two being cemented together to protect the lines or the pattern. This screen is mounted in a position close to the photographic plate and must be focused accurately, usually by visual focusing because of the differences in thickness in the glass.

Such color filters and separate screens produce satisfactory results when used carefully by skilled operators. However, both the color filters and screens are expensive, as they must be made of high-grade material, with perfectly plane surfaces in order to avoid distortion of the image, and great care must be taken to see that the surfaces of both the filters and the screens are clean, in order to avoid indistinct or hazy images. Furthermore, the camera must be designed to support both the filter and the screen, and both the filter and screen are fragile and require very careful handling.

The principal object of my invention is to provide a combined color filter and screen in a single article of manufacture. Another object is to provide a combined color filter and screen which can be easily and cheaply produced and which will not be fragile. Another object is to provide a combined color filter and screen which will not require the usual focusing of the screen element. A further object is to provide a set of combined color filters and screens, for use in three color printing, in which careful adjustment of the position of the screen in the camera will not be required.

A further object is to provide combined color filters and screens which may be manufactured in uniform thickness so that the devices can be accurately positioned in the camera by a previously adjusted holder, thus eliminating visual focusing.

Briefly, a preferred form of my color filter screen comprises a supporting frame and an open mesh fabric supported thereby, the interstices of the fabric being filled with a colored, transparent, gelatinous material.

Figure 3:
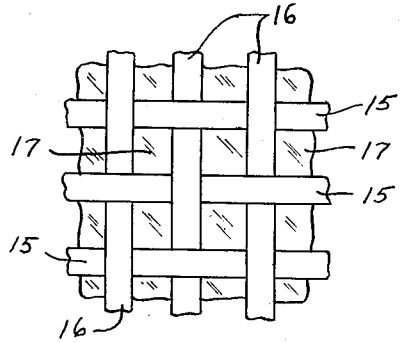
Figure 2:
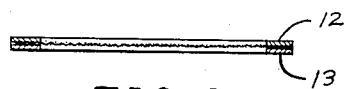
Figure 4:
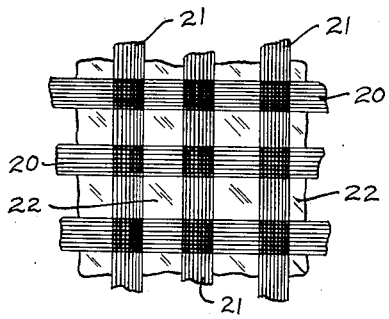
Figure 5:
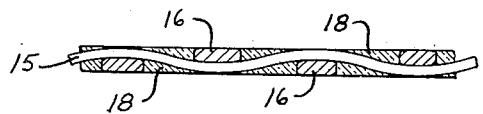

Referring to the drawing, Fig. 1 is a plan view of a combined color filter and screen made according to my invention; Fig. 2 is a section along the line 2—2 of Fig. 1; and Fig. 3 is a greatly enlarged plan view of a modification of my combined color filter and screen; and Fig. 4 is an enlarged diagrammatic view illustrating the transmission of light by another modification of the device; Fig. 5 is a cross-section of a modified form.

As shown in Figs. 1 and 2, the screen material indicated generally at 10 may be supported by a metal frame 11, which comprises two similar hollow rectangular members 12 and 13, adapted to clamp the screen material between them.

In the modification shown in Fig. 3 of the drawing, a form of my combined color filter and screen is illustrated, which is particularly adapted to produce sharp and clear reproductions. In this modification an open mesh fabric, formed of intersecting sets of substantially parallel strands, is employed. Preferably this fabric is woven of ribbon-like flat filaments 15 and 16 of opaque material, such as an extruded cellulose material. Such a fabric has the important advantage of being very flat or thin, and thus it is possible to obtain a sharp screen image on the sensitive plate. The interstices of the fabric are filled with a gelatinous material or any other suitable substance, such as a cellulose material, of the required color. This material may only fill the interstices, as indicated at 17 in Fig. 3, or, as shown in Fig. 5, the woven fabric may be imbedded in transparent material 18. In any event, it will be seen that the interstices of the screen are completely filled by the colored transparent material, and that all light reaching the sensitive photographic surface must pass therethrough.

Fig. 4 of the drawing diagrammatically illustrates a combined color filter and screen, in which a translucent screen element, such as is disclosed in my co-pending application, Serial No. 566,640, filed of even date herewith, is employed. This element comprises intersecting sets of translucent strands 20 and 21 of textile or cellulose material, and by employing such a screen element, a pleasingly soft and rich effect is obtained in the reproduction. By means of the translucent element a graduated screen effect is obtained, which enables an accurate reproduction to be made of all of the fine gradations in tone of the original subject. In this modification the interstices of the fabric are filled in with colored gelatinous material 22 in the manners described in connection with the modifications shown in Figs. 3 and 5 of the drawing, and the translucent screen members may also be of the same color as the gelatinous material.

Any suitable dyes and any desired colors may be employed. For example, in producing correct monochrome reproductions of colored subjects, it is frequently necessary to hold back or slow down the action of the blue light, for, as is well known in the art, the ordinary photographic plate is much more sensitive to blue rays, or rays at the shorter end of the spectrum than to the longer red rays. When it is desired to produce a correct monochrome reproduction, it is frequently advisable to hold back the blue rays by means of a yellow color filter. Also, in the reproduction of colors, three negatives are ordinarily made, the respective exposures being made through red, green and blue violet filters.

In connection with three-color reproductions, my combined color filter and screen has an important advantage. In ordinary three-color work, by the half-tone or similar process, the screen is shifted or rotated between the exposures of each of the three negatives. This is done so that the dots produced on the plates by the respective negatives will not be superposed, but will be adjacent each other. In this manner, the color reproductions can be obtained by the combined effects of the dots of the three different colors, positioned adjacent each other, rather than by the actual mixture of the colors of the ink by super-position of the dots. By this additive method, much more brilliant color reproductions can be obtained than when the dots are superposed.

In order to properly adjust screens to provide for the separation of the dots in the three negatives, complicated camera mechanism is necessary to allow for the rotation of the screen and a great deal of care is required in the adjustment thereof. To remove these difficulties I propose to construct combined color filters and screens, as hereinbefore disclosed, in sets, each set comprising the necessary number of color filters and screens, three or more being generally used, and in each set the screen element is positioned so that the strands of the fabric will run in different directions from the strands in every other screen element of the set.

The fabric comprising the screen portion of my combined color filter and screen may be accurately woven and accurately positioned in the metal frame 11, so that when a proper holder is provided in the camera it will only be necessary to insert the combined color filters and screens of the set into the holder in rotation as the various negatives are produced. Such a procedure reduces the expense of the camera, reduces the time necessary for making reproductions, and will result in uniformly excellent products.

From the foregoing description of various forms of my invention, it will be seen that I have provided a combined color filter and screen which is adapted simultaneously to produce the necessary screen effects used in photographic reproduction processes, and at the same time to make the color corrections necessary in the correct monochrome reproductions of colored objects, or to make the necessary negatives for use in connection with three-color printing. It will be seen that my screen eliminates the necessity of a complicated camera which is adapted to support both color filters and cumbersome glass screens, and that by reason of the fact that my screen can be very accurately constructed, it is possible to do away with visual focusing of the screen and with the adjustment of the screen necessary in three-color work.

I have also provided a durable and easily constructed color filter and screen which may be manufactured at a fraction of the cost of present devices, and which will produce excellent results with only a minimum degree of care and average skill on the part of the operator.

I claim:

1. A combined color filter and screen comprising an open mesh fabric woven of flat filaments, the interstices of the fabric being filled with a colored translucent material bounded by parallel planes on opposite sides.

2. A combined color filter and screen comprising an open mesh fabric woven of strands of translucent material of one color, the interstices of the fabric being filled with a translucent material of substantially the same color as the fabric.

3. A set of combined color filters and screens for use in color printing, each combined filter and screen comprising an open mesh fabric screen woven of intersecting sets of strands, and having the interstices thereof filled with translucent material of the required color, and a supporting frame for the fabric, the strands in each combined color filter and screen of the set extending in different directions in relation to the respective frames thereof, whereby the dots produced by the screen in each negative photographed through the respective screens will lie in different positions.

4. A set of combined color filters and screens for use in color printing, each combined filter and screen comprising an open mesh fabric screen woven of intersecting sets of flat filaments, and having the interstices thereof dyed the required color, and a supporting frame for the fabric, the strands in each combined color filter and screen of the set extending in different directions in relation to the respective frames thereof, whereby the dots produced by the screen in each negative photographed through the respective screens will lie in different positions.

5. A set of combined color filters and screens for use in color printing, each combined filter and screen comprising an open mesh fabric screen woven of intersecting sets of translucent flat filaments, and having the interstices thereof filled with translucent material of the required color, and a supporting frame for the fabric, the strands in each combined color filter and screen of the set extending in different directions in relation to the respective frames thereof, whereby the dots produced by the screen in each negative photographed through the respective screens will lie in different positions.

6. A combined color filter and photographic screen comprising an open mesh fabric embedded in transparent material which fills the interstices and overlaps the fabric strands at regions other than their crossings.

GEORGE S. ROWELL.